(12) United States Patent
Jenness et al.

(10) Patent No.: US 6,357,291 B1
(45) Date of Patent: Mar. 19, 2002

(54) APPARATUS AND METHOD FOR MEASURING BRAKE BIAS

(75) Inventors: Blair Matthew Jenness, Farmington Hills; John Stephen Probst, Belleville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,803

(22) Filed: Dec. 22, 1999

(51) Int. Cl.[7] .................................................. B60T 8/00
(52) U.S. Cl. ......................................... 73/129; 340/453
(58) Field of Search ........................... 73/132, 121–129, 73/862.12, 862.18, 862.49; 340/453, 454

(56) References Cited

U.S. PATENT DOCUMENTS

| | | | |
|---|---|---|---|
| 4,705,323 A | * 11/1987 | Imoto et al. | 303/116 |
| 4,770,473 A | * 9/1988 | Tsuchida | 303/115 |
| 5,003,829 A | * 4/1991 | DeConti et al. | 73/862.12 |
| 5,474,161 A | 12/1995 | Eaton, III et al. | |
| 5,577,816 A | * 11/1996 | Suzuki et al. | 303/174 |
| 5,622,241 A | * 4/1997 | Null | 188/73.42 |

* cited by examiner

*Primary Examiner*—George Dombroske
(74) *Attorney, Agent, or Firm*—Jennifer M. Stec

(57) ABSTRACT

An apparatus and method for measuring brake bias in a brake system on a vehicle includes a brake bias measuring pad, such that the brake bias measuring pad is operatively positioned within a brake caliper in the brake system. The apparatus also includes a load measuring mechanism disposed within the brake bias measuring pad, such that the load measuring mechanism measures a load applied by a brake caliper piston on the brake bias measuring pad. The method includes the steps of measuring a load applied by a brake caliper piston on a brake bias measuring pad operatively positioned within a brake caliper in a brake assembly of the brake system. The method also includes the steps of determining a brake caliper pressure based on the load applied by a brake caliper piston on the brake bias measuring pad and determining a load in the brake caliper based on the caliper pressure. The method further includes the steps of determining a brake bias for a brake assembly as a ratio of the brake caliper load for the brake assembly versus a total of the brake caliper loads for each brake assembly in the brake system and adjusting the brake pressure in the brake system based on the brake bias.

17 Claims, 2 Drawing Sheets

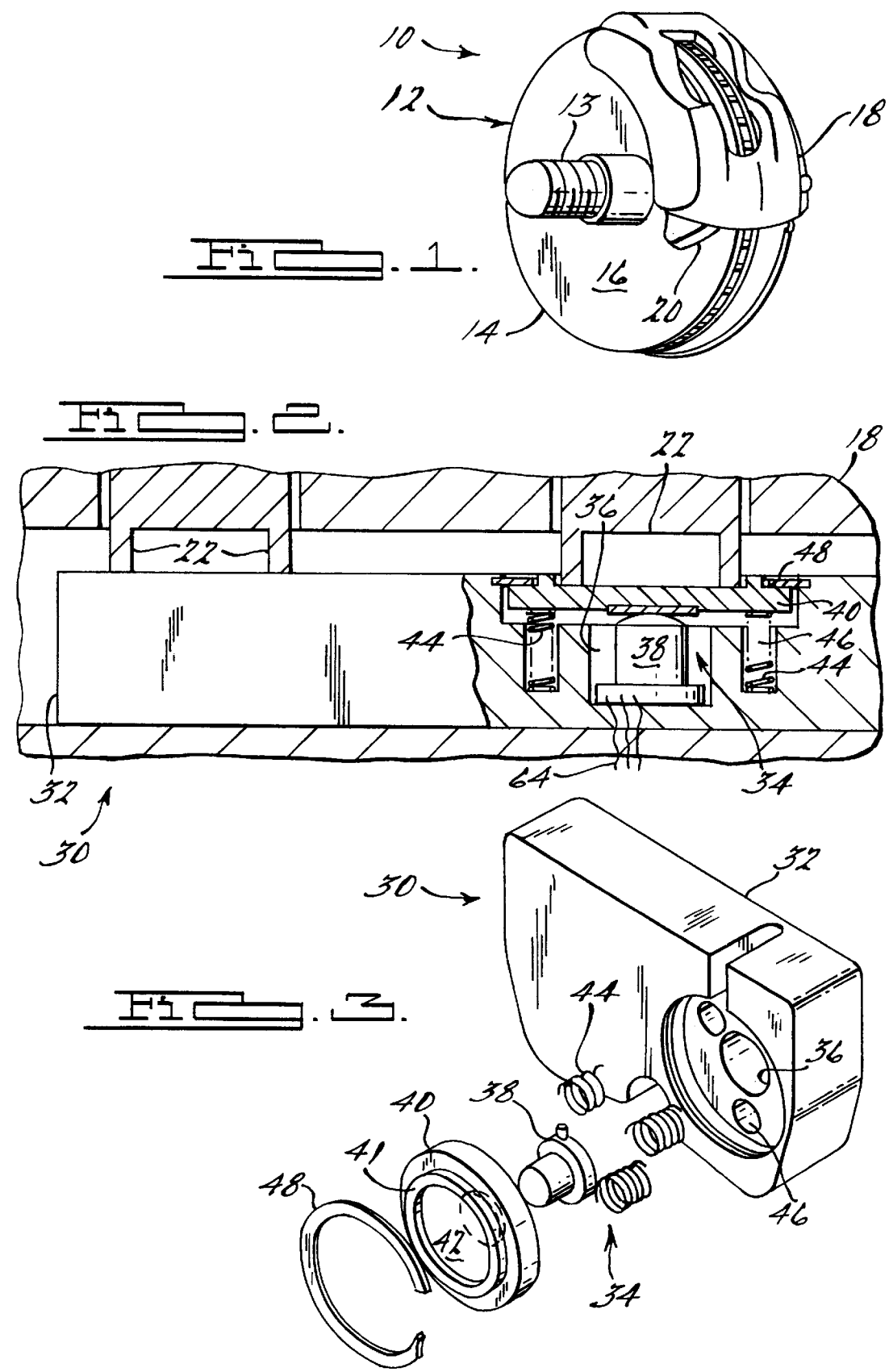

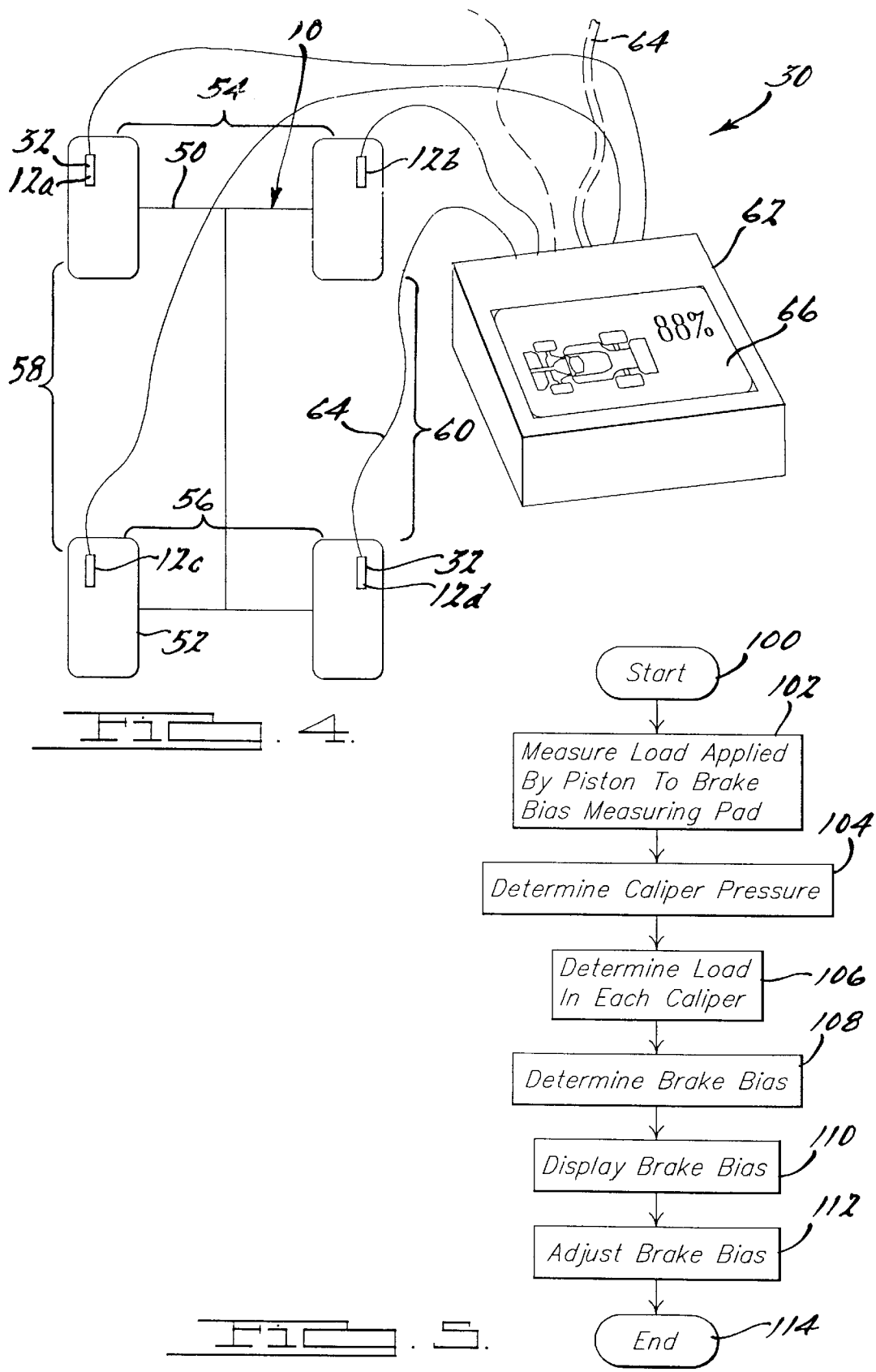

APPARATUS AND METHOD FOR MEASURING BRAKE BIAS

BACKGROUND OF THE INVENTION

1. Field of the Invention

The present invention relates generally to brakes in vehicles and, more specifically, to an apparatus and method for measuring brake bias in a brake system on a vehicle.

2. Description of the Related Art

Vehicle racing, such as automotive cart track racing, is a specialized and competitive sport involving a vehicle designed specifically for that purpose. A race vehicle takes advantage of available vehicle system technologies that enhance the speed and handling of the vehicle. A brake system on the race vehicle is optimized to maximize the braking force necessary to slow the vehicle down in a minimal period of time, while still maintaining control of the vehicle. For example, in threshold braking, the driver applies the brakes hard at the last opportunity, such as going into a corner, and releases the brakes quickly to regain speed, such as coming out of a corner.

The performance of the brake system is optimized using a ratio referred to in the art as brake bias. Brake bias is a ratio of the braking force applied to one or more wheels relative to a total braking force. A race vehicle typically utilizes a brake on each wheel. The braking force may be biased towards the front brakes, the rear brakes, the left-side brakes or right-sight brakes, depending on the desired braking and handling characteristics for the race vehicle. In a racing situation, the brakes are typically biased towards the front brakes, since a braking force biased towards the rear brakes may increase the possibility of the rear brakes locking up, causing the vehicle to spin under certain operating conditions.

In the past, the brake bias was statically determined by measuring brake-line pressure in a front brake line and a rear brake line and calculating a brake bias ratio. To measure the pressure within the brake line, the brake line is unsealed, a pressure transducer is placed within the brake line, and the brake line is purged. A braking force is applied to the brake pedal, generating a pressure within the brake line. When the pressure in the front brake line reaches a predetermined pressure, such as 1000 psi, the rear brake line pressure is measured. The brake bias is calculated as a ratio of the brake line pressure for one brake relative to a total brake line pressure, using the pressure reading displayed on the pressure transducer. The pressure in the brake lines is adjusted to the desired ratio, such as with a proportioning mechanism, as is known in the art. The pressure transducers are removed from the brake lines, the brake lines are resealed, and purged of air.

While this method of measuring brake bias works, it is time consuming and may result in a variance in the brake bias ratio after sealing and purging the brake lines. Thus, there is a need in the art for an apparatus and method of accurately measuring brake bias in a timely manner.

SUMMARY OF THE INVENTION

Accordingly, the present invention is an apparatus and method for measuring brake bias in a brake system on a vehicle. The apparatus includes a brake bias measuring pad, such that the brake bias measuring pad is operatively positioned within a brake caliper in the brake system. The apparatus also includes a load measuring mechanism disposed within the brake bias measuring pad, such that the load measuring mechanism measures a load applied by a brake caliper piston on the brake bias measuring pad. The method includes the steps of measuring a load applied by a brake caliper piston on a brake bias measuring pad operatively positioned within a brake caliper in a brake assembly of the brake system. The method also includes the steps of determining a brake caliper pressure based on the load applied by a brake caliper piston on the brake bias measuring pad and determining a load in the brake caliper based on the caliper pressure. The method further includes the steps of determining a brake bias for a brake assembly as a ratio of the brake caliper load for the brake assembly versus a total of the brake caliper loads for each brake assembly in the brake system and adjusting the brake pressure in the brake system based on the brake bias.

One advantage of the present invention is that an apparatus and method for measuring a brake bias in a brake system on a vehicle is provided that accurately determines a braking force on a wheel. Another advantage of the present invention is that an apparatus and method for measuring a brake bias is provided that quickly determines a brake bias ratio. Still another advantage of the present invention is that an apparatus and method for measuring a brake bias is provided that determines the braking force on a wheel that is less intrusive.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is a perspective view of a brake system on a vehicle.

FIG. 2 is a fragmentary view of an apparatus, according to the present invention, for measuring brake bias in the brake system of FIG. 1.

FIG. 3 is an exploded view of the apparatus of FIG. 2.

FIG. 4 is a diagrammatic view of the apparatus of FIG. 2 illustrated in operational relationship with a vehicle.

FIG. 5 is a flowchart of a method according to the present invention, for measuring brake bias in the brake system of FIG. 1.

DESCRIPTION OF THE PREFERRED EMBODIMENT(S)

Referring to the drawings, and in particular FIG. 1, one embodiment of a brake system 10 for a vehicle 50 (FIG. 4), such as an automotive vehicle, is illustrated. It should be appreciated that the vehicle 50 is of the type suitable for racing.

The brake system 10 includes a brake assembly 12a, 12b, 12c, 12d for wheels 52 (FIG.4) of the vehicle 50. Each wheel 52 is operatively coupled to wheel hub (not shown) for rotational movement relative to a wheel spindle (not shown), and supports the vehicle 50 during rolling engagement with a surface, such as a road. The brake assembly 12 is mounted to the wheel spindle and wheel hub as is understood in the art.

In this example, the brake assembly 12 is of a disc brake type. The brake assembly 12 includes a brake rotor 14 mounted on the wheel hub using a mounting means (not shown) that is conventional in the art. The rotor 14 defines a disc or annulus having a centrally disposed opening for mounting the brake assembly 12 onto the wheel hub. Preferably, the wheel hub includes one stud 13 for receiving the brake assembly 12. The brake rotor 14 also includes a pair of friction or braking surfaces 16 disposed annularly about the brake rotor 14 and generally parallel relative to each other on opposite sides of the brake rotor 14.

Referring to FIGS. 1 and 2, the brake assembly 12 includes a brake caliper 18 operatively and fixedly mounted to the wheel spindle. The brake caliper 18 straddles the brake rotor 14. It should be appreciated that the brake caliper 18, in this example, is of the fixed type. The brake caliper 18 includes a brake shoe or pad 20 operatively mounted on the brake caliper 18 for applying braking pressure to the braking surface 16 of the brake rotor 14 to slow the rotation of the wheel 52. The brake pad 20 includes an actuator such as a piston 22, that operatively displaces the brake pad 20 in applying the braking pressure to the brake rotor 14. In operation, the actuation of the piston 22 and brake pad 20 applies a braking pressure to the braking surface 16 of the brake rotor 14 to slow down the rotational movement of the brake rotor 14 and thus the wheel 52. It should be appreciated that, in this example, the brake caliper 18 includes four brake pads 20 to apply braking pressure to both sides of the brake rotor 14. The brake caliper 18 includes two pistons 22 actuating each brake pad 20.

The brake system 10 also includes a line (not shown) that interconnects the brake assembly 12 with a proportioning mechanism (not shown) that distributes the force within the brake system 10. As is known in the art, a braking force from a brake pedal (not shown) is transmitted to the proportioning mechanism, which generates a pressure that is transmitted through the brake lines to the brake assemblies 12a, 12b, 12c, 12d mounted on each wheel 52 of the vehicle 50, to slow down the vehicle 50. The transmission of pressure can be biased between a front brake 54 and rear brake 56, or left side brake 58 and right side brake 60. Brake bias is a measurement of the braking force applied to one or more brake assemblies 12 relative to the total braking force applied to all of the brake assemblies 12a, 12b, 12c, 12d. Preferably, in the vehicle 50, the brake system 10 is biased towards the front brake 54, to enhance the stability and control of the vehicle 50.

Preferably, the brake system 10 includes other component parts, such as valves (not shown) and lines (not shown) which are conventional and well known in the art to operatively slow down the vehicle 50.

Referring to FIGS. 2 through 4 an apparatus or brake bias measurement system 30, according to the present invention, for measuring a brake bias in the brake system 10 is illustrated. The brake bias measurement system 30 includes a brake bias measuring pad 32 having the same general shape and properties as the conventional brake pad 20. Preferably, the brake bias measuring pad 32 is made of a metal material such as aluminum. The brake bias measuring pad 32 includes a load measuring mechanism 34 disposed within a first recess 36 in the brake bias measuring pad 32. In this example, the first recess 36 is generally circular in shape and has a general, cross-sectional T-shape. Preferably, the first recess 36 is located within the brake bias measuring pad 32 such that the load measuring mechanism 34 is aligned with the piston 22.

The load measuring mechanism 34 includes a load cell 38, such as a compression-type load cell. In this example, the load cell 38 is a button compression-type load cell.

The load measuring mechanism 34 also includes a generally annular load plate 40 disposed within an upper portion of the recess 36, between the load cell 38 and the piston 22. Preferably, the load plate 40 is made from a steel material.

The load plate 40 transfers the load from th piston 22 to the load cell 38. Since the piston 22 may have a different shape and size than the load plate 40, the load plate 40 prevents an uneven distribution of load applied to the load cell 38.

The load plate 42 includes a load centering ring 41 positioned on a surface thereon, to prevent an uneven distribution of load from the piston 22 directed towards the load cell 38. Preferably, the load centering ring is a annular ring that is integral and one with the load plate 40. The load plate 40 also includes a centrally located load centering recess 42 for positioning the brake bias measuring pad 32 with respect to the brake caliper piston 22. Advantageously, the load centering ring 41 insures that the load applied by the piston 22 is acting on a centerline axis (not shown) of the load cell 38. This arrangement avoids off centerline loading on the load cell 38 that could result in an erroneous force determination due to the piston load being transformed into a lateral load and moment.

The load measuring mechanism 34 also includes a load plate balancing mechanism 44, such as a spring, to support the load plate 40. Advantageously, the weight of the load plate 40 does not preload the load cell 38 when zeroing a measurement of the brake bias measuring system. In this example, the spring 44 is a compression spring. The spring 44 is disposed within a second recess 46. The second recess 46 is located adjacent a lower portion of the first recess 36, and contiguous with the upper portion of the first recess 36. Preferably, there are three springs 44 positioned within three second recesses 46 surrounding of the load cell 38, to evenly support the load plate 40.

The load measuring mechanism 34 also includes a retaining mechanism 48 to retain the load plate 40 and spring 44 within the brake bias measurement pad 32. Preferably, the retaining mechanism 48 is a ring made from a flexible metal material. Advantageously, the load measuring mechanism 34 is removable from the brake bias measuring pad 32, for replacement purposes or the like.

The brake bias measurement system 30 includes a controller 62. The load measuring mechanism 34 is operatively connected to the controller 62, such as through a wire 64. Preferably, there is a brake bias measuring pad 32 positioned in each brake assembly 12a, 12b, 12c, 12d for each of the four wheels 52 of the vehicle 50. Further, the load measuring mechanism 34 for each brake bias measuring pad 32 is connected to the controller 62, as shown in FIG. 4.

The controller 62 includes a microprocessor, memory and display screen 66. The controller 62 operatively receives inputs from each of the load measuring mechanisms 34, calculates the brake bias, and displays the result on the display screen 66 in a manner to be described. In this example, the controller 62 is a hand held device. Advantageously, the display screen 66 may include a resistive touch pad to receive input from the user.

In operation, one brake pad 20 is removed from a brake caliper 18 within the brake assembly 12, and replaced with a brake bias measuring pad 32. A brake bias measuring pad 32 is installed in the brake assembly 12 for one or more of the wheels 52 of the vehicle 50. An operator steps on the brake pedal, resulting in the actuation of the brake caliper 18 on the brake rotor 14. The piston is directed into the load centering recess 42 within the load plate 40. The force of the piston 22 applied to the brake bias measuring pad 32 is measured by the load measuring mechanism 34 within the brake bias measuring pad 32, and communicated to the controller 62. The brake bias ratio is calculated by the controller 62 in a manner to be described. The brake bias can be adjusted by adjusting the proportioning mechanism, to distribute the pressure applied between the front brake 54 and rear brake 56, or left-side brake 58 and right side brake 60, as is understood in the art.

Referring to FIG. 5, a flowchart of a method of measuring brake bias in the brake system 10 is described. The methodology begins in bubble 100 and continues to block 102. In block 102, the method uses the brake bias measurement system 30 to measure the pressure within the brake system 10, by first replacing one brake pad 20 for each brake assembly 12 with the brake bias measuring pad 32. Next, an operator applies a force to the brake pedal to generate a pressure within the brake lines. The actuation of the brake caliper 18 and piston 22 will load the brake bias measuring pad 32. The method measures the resulting load by the load measuring mechanism 34 which is communicated to the controller 62. It should be appreciated that a front right, front left, rear right and rear left load is measured for each corresponding brake assembly 12a, 12b, 12c, 12d and wheel 52. The methodology advances to block 104.

In block 104, the methodology determines a brake caliper pressure from the load measured by the load measuring mechanism 34. For example, the brake caliper pressure is the load measured by the load measuring mechanism 34 divided by a surface area of a face of the piston 22. Advantageously, it is assumed that the pressure is the same throughout the brake caliper 18. The methodology advances to block 106.

In block 106, the methodology determines a brake caliper load for each brake assembly 12a, 12b, 12c, 12d. For example, the brake caliper load is the brake caliper pressure multiplied by the total surface area the face of all the pistons 22 within the brake caliper 18. The methodology advances to block 108.

In block 108, the methodology determines a brake bias. It should be appreciated that the brake bias can be determined for the front brake 54, rear brake 56, left-side brake 58 or right-side brake 60.

For example, the front brake bias can be determined from a ratio of the total front brake caliper load versus a total brake system caliper load. It should be appreciated that the total brake system caliper load is a summation of the right front, left front, right rear and left rear brake caliper loads. Similarly, the total front brake caliper load is a summation of the right front and left front brake caliper loads. The total rear brake caliper load is a summation of the right rear and left rear brake caliper loads. The total right brake caliper load is a summation of the right front and right rear brake caliper loads. The total left brake caliper load is a summation of the left front and left rear brake caliper loads.

Advantageously, the brake bias can also be expressed using pressures and a conversion factor, as is known in the art. The brake bias pressure corresponds to the pressure reading obtained using an in-line pressure transducer within the brake line. For example, the brake bias front pressure is a ratio of the pressure of the front brake 54 versus the total brake pressure. The methodology advances to block 110.

In block 110, the brake bias is displayed on the display screen 66 of the controller 62. Advantageously, a user may select from various options as to how the brake bias is displayed. For example, the brake bias may be expressed as a percentage, graphically, or as a histogram. The user may also select the units, such as force or pressure. The user may further select the bias ratio format, such as front/rear, rear/front, left/right, right/left. The methodology advances to block 112. In block 112, the user adjusts the brake pressure based on the brake bias, as previously described. The methodology advances to bubble 114 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An apparatus for measuring brake bias in a brake system on a vehicle, comprising:
    a brake bias measuring pad, wherein said brake bias measuring pad is operatively positioned within a brake caliper in the brake system; and
    a load measuring mechanism disposed within said brake bias measuring pad, wherein said load measuring mechanism measures a load applied by a brake caliper piston on said brake bias measuring pad.

2. An apparatus as set forth in claim 1 wherein said load measuring mechanism includes a load cell disposed within a first recess in said brake bias measuring pad.

3. An apparatus set forth in claim 2 wherein said load measuring mechanism includes a load plate disposed within said first recess, wherein said load plate is positioned between said load cell and the brake caliper piston.

4. An apparatus as set forth in claim 3 wherein said load plate includes a load centering ring disposed on a surface of said load plate, for centering a load of the brake caliper piston relative to said load measuring mechanism.

5. An apparatus as set forth in claim 4 wherein said load measuring mechanism includes a load plate balancing mechanism disposed within a second recess in said brake bias measuring pad, and said load plate balancing mechanism supports said load plate.

6. An apparatus as set forth in claim 5 wherein said load plate balancing mechanism is a spring.

7. An apparatus as set forth in claim 1 including a retaining mechanism disposed within a recess in said brake bias measuring pad for retaining said load measuring mechanism within said brake bias measuring pad.

8. An apparatus as set forth in claim 1 including a controller in communication with said load measuring mechanism.

9. An apparatus as set forth in claim 1 including a brake bias measuring pad operatively positioned within the brake caliper for each of the four wheels of the vehicle.

10. A brake bias measurement system for a brake system in a vehicle, comprising:
    a brake bias measuring pad having a first recess, wherein said brake bias measuring pad is operatively positioned within a brake caliper in the brake system;
    a load cell disposed within said first recess in said brake bias measuring pad, wherein said load cell measures a load applied by a brake caliper piston on said brake bias measuring pad;
    a load plate disposed within said first recess, wherein said load plate is positioned between said load cell and the brake caliper piston;
    a load centering mechanism disposed on a surface of said load plate, wherein said load centering mechanism centers a load of the brake caliper piston relative to said load centering mechanism; and
    a retaining mechanism disposed within said first recess for retaining said load measuring mechanism within said brake bias measuring pad.

11. A brake bias measurement system as set forth in claim 10 including a load plate balancing mechanism disposed within a second recess in said brake bias measuring pad, wherein said load plate balancing mechanism supports said load plate.

12. A brake bias measurement system as set forth in claim 10 wherein said load plate balancing mechanism is a spring.

13. A brake bias measurement system as set forth in claim 10 including a controller in communication with said load measuring mechanism.

14. A brake bias measurement system as set forth in claim 10 including a brake bias measuring pad operatively positioned within the brake caliper for each of the four wheels of the vehicle.

15. A method of measuring brake bias in a brake system on a vehicle, said method comprising the steps of:

measuring a load applied by a brake caliper piston on a brake bias measuring pad operatively positioned within a brake caliper in a brake assembly of the brake system;

determining a brake caliper pressure based on the load applied by a brake caliper piston on the brake bias measuring pad;

determining a load in the brake caliper based on the caliper pressure;

determining a brake bias for a brake assembly as a ratio of the brake caliper load for the brake assembly versus a total of the brake caliper loads for each brake assembly in the brake system; and adjusting the brake pressure in the brake system based on the brake bias.

16. A method as set forth in claim 15 including the step of displaying the brake bias on a display screen in a controller after said step of determining a brake bias.

17. A method as set forth in claim 15 wherein said brake bias measuring pad includes a load measuring mechanism disposed therein.

* * * * *